United States Patent [19]
Cecchin et al.

[11] Patent Number: 5,077,327
[45] Date of Patent: Dec. 31, 1991

[54] SPHEROIDAL PARTICULATE POLYMER COMPOSITIONS

[75] Inventors: Giuliano Cecchin; Floriano Gugliemi; Livio Balzani, all of Ferrara, Italy

[73] Assignee: Himont Incorporated, Wilmington, Del.

[21] Appl. No.: 559,748

[22] Filed: Jul. 30, 1990

[30] Foreign Application Priority Data

Aug. 2, 1989 [IT] Italy ................. 21422 A/89

[51] Int. Cl.⁵ ............... C08L 23/12; C08L 23/16; C08L 95/00
[52] U.S. Cl. .......................... 524/68; 524/70; 524/71; 525/240
[58] Field of Search ................ 524/68, 70, 71; 525/240

[56] References Cited

U.S. PATENT DOCUMENTS

| | | | |
|---|---|---|---|
| 4,707,413 | 11/1987 | Kehr et al. | 524/70 |
| 4,777,216 | 1/1987 | Busico et al. | 525/268 |
| 4,829,109 | 5/1989 | Ciaccia et al. | 524/68 |
| 4,835,199 | 5/1989 | Futamura et al. | 524/68 |
| 4,837,252 | 6/1989 | Seguin et al. | 524/68 |

Primary Examiner—Allan M. Lieberman

[57] ABSTRACT

Polymer compositions in the form of spheroidal particles with average diameter between 0.5 and 7 mm, comprising:
  A) 10-50 parts by weight of homopolymer of propylene with an isotactic index greater than 90 and an intrinsic viscosity from 0.5 to 1.5 dl/g;
  B) 50-90 parts by weight of propylene-ethylene copolymer containing 15-45% by weight of ethylene and having an intrinsic viscosity between 0.5 and 1.5 dl/g. The compositions are suitable for the modification of bitumens.

7 Claims, No Drawings

SPHEROIDAL PARTICULATE POLYMER COMPOSITIONS

The present invention refers to polymer compositions particularly useful in the modification of bitumens, obtained in the form of spheroidal particles having controlled particle size, and to the method for prepared said compositions.

It is known that one of the most important applications for bitumens is in preparing waterproof roofing materials, road paving materials, etc.

It is also known that, in order to be suited for these uses, the bituminous material generally must be modified with those polymer substances which improve substantially some important characteristics, such as embrittlement temperature and softening point.

Among the polymeric modifiers described in the known literature, are atactic polypyropylene, ethylene-propylene rubbers and block thermoplastic elastomers of the styrene-butadiene-styrene type as described in S. Piazza et al., Poliplasti, 257,91 (1979) and A. Halasz et al., 130th ACS Rubber Division Meeting, Atlanta, October, 1986.

All of the modifiers mentioned above, however, have some disadvantages.

Commercially available atactic polypropylene, for example, is a by-product of the production of isotactic polypropylene and it is seldom available in lots having essentially constant and reproducible properties. Moreover, in order to confer the desired properties to the bitumen composition, it must be used together with a suitable quantity of isotactic polypropylene.

The commercial products of propylene-ethylene or propylene-ethylene-diene copolymers are generally inadequate for the use mentioned above because of their high viscosity which makes them difficult to disperse in the bituminous mass. They also do not provide the desired high softening temperature.

Finally, the block copolymers of the styrene-butadiene-styrene type offer bituminous mixtures which have unsatisfactory resistance to aging and unsatisfactory softening point.

Recently the preparation, directly by polymerization, of additives for bitumens made up of an isotactic polypropylene fraction, an atactic polypropylene fraction and an amorphous propylene-ethylene copolymer fraction has been suggested (see U.S. Pat. No. 4,777,216).

The preparation of said composition, however, is hard to carry out on an industrial scale because they cause the formation of a product which is partially soluble in the reaction medium, with resulting problems of low productivity, run irregularity, reactor fouling and difficult product recovery.

This invention provides a process for preventing all the disadvantages mentioned above, which results in a polymer material having the desired composition, structure and properties.

Another aspect of the present invention is that it provides a polymer material useful as an additive for bitumens in the form of spheroidal polymer granulates or particulates having a controlled particle size distribution that is, easily and readily dispersible in the bituminous mass.

The compositions of the invention comprise:
A) 10–50 parts by weight, preferably 15–35 parts by weight, of a propylene homopolymer having an isotactic index greater than 90 and an intrinsic viscosity from 0.5 to 1.5 dl/g, preferably 0.5 and 1 dl/g; and
B) 50–90 parts by weight, preferably 68–85 parts by weight, of propylene-ethylene copolymer containing 15–45% by weight, preferably 20–35% by weight, of ethylene and having an intrinsic viscosity from 0.5 to 1.5 dl/g, preferably from 0.7 to 1.2 dl/g.

The compositions contain from 40 to 90% by weight, preferably 60–75%, of material soluble in xylene at room temperature, with an ethylene content of 20–40% by weight. The material insoluble in xylene is essentially a propylene homopolymer and optionally propylene-ethylene copolymer and may contain up to 30% by weight of polymerized ethylene.

The compositions are obtained in the form of spheroidal granulates or particulates having a diameter from 0.5 to 7 mm, preferably from 2 to 5 mm, a flowability of less than 30 seconds and bulk density (tamped) greater than 0.4 g/cc.

The process comprises sequential polymerization reactions done in at least two stages, where in the first stage the propylene is polymerized to form component A), and in the subsequent stages the propylene-ethylene mixtures are polymerized to form component B). The catalyst used in both stages is a stereospecific Ziegler-Natta catalyst.

The process can be conducted in liquid, gaseous, or liquid/gaseous phase. The preferred process comprises carrying out at least the propylene and ethylene copolymerization in gaseous phase.

The polymerization of the propylene and ethylene can occur in the presence of $C_4$–$C_{10}$ alpha-olefin, or of a conjugated or nonconjugated diene, such as butadiene, 1,4-hexadiene, 1,5-hexadiene and ethylidene-norbornene-1. Typical $C_4$–$C_{10}$ alpha-olefins include butene-1, 4-methyl-pentene-1 and hexene-1.

The reaction temperature in the first stage and the second stage can be the same or different, and is generally from 30° C. to 90° C., preferably from 50° C. to 80° C. for the first stage, and from 40° C. to 60° C. for the second stage.

The pressure employed in the first stage is the one that competes with the vapor pressure of the liquid propylene at the selected working temperature, modified, if necessary, by the vapor pressure of the small quantity of the inert diluent used to feed or as a carrier for the catalyst system and by the overpressure of the hydrogen which is used to regulate the molecular weight.

The pressure relative to the first or second stage, if they are carried out in gaseous phase, can be from 5 to 30 atmospheres. The residence times of each of the two stages depend on the desired ratio between the homopolymer and co- or terpolymer fractions, and are generally from 30 minutes to 8 hours. As molecular weight regulators the traditional chain transfer agents known in the art, such as hydrogen and $ZnEt_2$, can be used.

The stereospecific catalyst used in the polymerization includes the reaction product of a solid catalyst component containing a titanium compound and an electron-donor compound (internal donor) supported on a magnesium chloride, with, as co-catalyst an Al-trialkyl compound and optionally an electron-donor compound (external donor).

In order to obtain the compositions of the invention in the form of flowable particles with high bulk density, it is essential that the solid catalyst component have the following properties:

surface area smaller than 100 m²/g, preferably between 50 and 80 m²/g.

porosity: from 0.25 to 0.4 cc/g.

X-ray spectrum: presence of a halo at angles $2\nu$ between 33.5° and 35°, and no reflections at $2\nu=14.95°$.

The catalyst component is prepared as follows:

A magnesium chloride adduct with alcohols, usually containing 3 moles of alcohol per mole of MgCl$_2$, is obtained in the form of spherical particles by emulsifying the adduct at the melting state in an inert hydrocarbon liquid immiscible with the adduct, and then cooling the emulsion quickly, in order to cause the solidification of the adduct in the form of spherical particles.

The particles are then submitted to partial dealcoholation, with a heating cycle between 50° and 130° C. under nitrogen, until the alcohol content is from 3 to 1.5 moles per mole MgCl$_2$.

The adduct is then suspended cold in TiCl$_4$, at a concentration of 40-50 g/l, and then brought to a temperature of 80°-135°, where it is maintained for -2 hours.

To the TiCl$_4$ is added also an electron-donor compound. Although other electron donors can be used, the diesters of aromatic carboxylic acids are preferred, most preferably the alkyl, cycloalkyl or aryl phthalates, such as diisobutyl, di n-butyl and di-n-octyl phthalate.

The excess TiCl$_4$ is separated hot, through filtration or sedimentation, and the treatment with TiCl$_4$ is repeated one or more times. The solid is then washed with aliquots of heptane or hexane, and consequently dried.

The solid catalyst component thus obtained has the following characteristics:

surface area: less than 100 m²/g, preferably from 50 to 80 m²/g porosity: 0.25-0.4 cc/g pore volume distribution where over 50% of the pores have a radius greater than 100 Å.

X-ray spectrum showing a halo with maximum intensity between the angles $2\nu$ of 33.5° and 35°, and no reflections at $2\nu$ of 14.45°.

The catalyst is obtained by mixing the solid catalyst component with an Al-trialkyl compound, particularly Al-triethyl and Al-triisobutyl, and an electron-donor compound which is preferably a silane compound of the formula R'R''Si(OR)$_2$ where R' and R'' are the same or different, and are alkyl, cycloalkyl or aryl radicals with 1-18 carbon atoms, and R is an alkyl radical with 1-4 carbon atoms.

Representative silanes are diphenyldimethoxysilane, dicyclohexyldimethoxysilane, methyl-tert-butyldimethoxysilane, diisopropyldimethoxysilane.

Silane compounds like phenyltriethoxysilane can also be used.

The Al/Ti ratio is usually from 10 to 100, and the molar ratio silane/Al from 1/5 to 1/50.

The catalysts can be precontacted with small quantities of olefin (prepolymerization), by maintaining the catalyst in a hydrocarbon solvent suspension and polymerizing at a temperature from room temperature to 50° C., until quantities of polymer from 0.5 to 3 times the weight of the catalyst are produced.

The polymerizations can also take place in liquid monomer, and in this case the quantity of polymer produced can be up to 1000 times the weight of the catalyst.

The polymer compositions of this invention are admixed with bitumens using known methods. The quantities used are generally from 15 to 40% by weight.

The data shown in the examples, comparative examples and the text which relate to the following properties have been determined according to the analytical methods indicated below.

| Property | Method |
|---|---|
| Ethylene weight % | I.R. Spectroscopy |
| Intrinsic viscosity | In tetrahydronaphthalene at 135° C. |
| Surface area | B.E.T. |
| Porosity | B.E.T. |
| Bulk density | DIN - 53194 |
| Flowability | The time that it takes 100 g of polymer to flow through a funnel with an opening having a diameter of 1.27 cm and the walls inclined at an angle of 20° C. with respect to the vertical. |
| Particle size | ASTM - D 1921 - 63 |

The weight percent of total co- or terpolymer (%B) is calculated by determining the weight of the monomer mixture fed in the second stage and comparing it to the weight of the final product.

The intrinsic viscosity of the B fraction ($\eta_B$) is calculated with the following formula:

$$\eta_B = (\eta_F - \% A\eta_A/100)/\%B/100$$

where $\eta_F$ and $\eta_A$ are the intrinsic viscosity of the final product and of the homopolymer (fraction A) respectively, and %A and %B are respectively the percent by weight of fraction A and fraction B compared to the final product.

The properties of the copolymer/bitumen mixtures have been determined according to the following analytical methods:

| Properties | Method |
|---|---|
| Penetration | ASTM D-5 |
| Ring & Ball softening point | ASTM E-28 |
| Embrittlement temperature | The temperature at which a plate of material, prepared as described hereinbelow (see Preparation of polymer composition-bitumen mixtures and characterization of samples of same), bent for 5 seconds on a mandrel with a diameter of 20 mm, begins to crack. |

Xylene soluble wt %

The weight percent of material soluble in xylene at room temperature is determined by dissolving 2.5 g of polymer in 250 ml of xylene at 135° C. in a vessel equipped with a stirrer while mixing. After 20 minutes the solution is cooled to 25° C., while continuing the agitation, and then allowed to stand for 30 minutes, so that the solids can settle.

The solids are filtered with filter paper and the remaining solution evaporated in nitrogen, and the solid residue is vacuum dried at 80° C. until constant weight is reached. The weight percent of polymer insoluble in xylene at room temperature is the isotactic index of the polymer. The value thus obtained corresponds substantially to the isotactic index determined by boiling n-heptane extraction, which by definition constitutes the isotactic index of the polymer.

EXAMPLES

General Operating Methods

1) The polymerization runs were conducted under nitrogen in a 22 litre stainless steel autoclave equipped with a helical magnetic agitator operated at about 90 rpm.

The gas phase was continuously analyzed with a process gas chromatograph in order to determine the ethylene, propylene and hydrogen content. During the polymerization ethylene, propylene and hydrogen were fed in a way that their desired concentrations were maintained constant.

The polymerization was a batch process in two stages: the homopolymerization of the propylene in liquid monomer in the first stage, and the copolymerization of ethylene and propylene in gas phase in the second stage.

A) 1st stage:

Into the autoclave, at 20° C. were introduced in the following order:

16 l of liquid propylene and about 0.15 g of the solid catalyst component prepared as described below, a mixture of 75 ml of Al-triethyl (TEAL) at 10% concentration in hexane, and phenyltriethoxysilane (PES) electron donor in amount such that the molar ratio AL/PES was about 7.5.

The catalyst system was fed with propylene pressure. The temperature was brought to 70° C. in about 10 minutes and maintained constant for the entire course of the polymerization.

After the established reaction time has passed, all the unreacted monomer was eliminated by degassing at 60° C. at atmospheric pressure.

B) 2nd stage:

The homopolymer derived from the first stage, after a sample has been taken for the various analyses, was brought to the preestablished temperature for the second stage. Then were fed, in order, propylene and ethylene in the desired ratios and quantities, in order to obtain the desired gas phase composition and the preestablished pressure.

During the polymerization, the pressure was maintained constant by feeding the ethylene-propylene mixture with the same composition of the desired copolymer from a tank thermostated at 90° C.

The feed time depends on the reactivity of the catalyst system and the quantity of polymer (B) desired to produce the particular composition.

At the end of the second stage polymerization the powder was discharged, stablilized and dried in an oven under a nitrogen stream at 60° C.

Preparation of the solid catalyst component 28.4 of anhydrous $MgCl_2$ and 49.5 g of anhydrous ethanol, 100 ml of vaseline oil ROL OB/30 and 100 ml of silicone oil(viscosity 350 cs) were introduced, under an inert atmosphere, into a flask immersed in a heat stabilized bath at 120° C. and under stirring until the $MgCl_2$ was completely dissolved. Thereby there was formed the $MgCl_2$ adduct with ethanol in admixture with oils. The hot mixture was then transferred, still under an inert atmosphere, to a 1,500 ml vessel provided with a heating jacket, and containing 150 ml of vaseline oil and 150 ml of silicone oil. This mixture was maintained at 120° C. and kept under stirring by means of a stirrer of the Ultra Turrax T-45 N type produced by Janke & Kunkel K. G. Ika Werke. The mixture was stirred for 3 minutes at 3000 rpm. Thereupon, the mixture was discharged into 2 liter vessel containing 1,000 ml of anhydrous n-heptane which was kept under stirring and cooled so that the final temperature did not exceed 0° C.

The $MgCl_2.3EtOH$ microspheres thus obtained, after filtering, were dried under vacuum at room temperature.

The $MgCl_2.3EtOH$ spherical support (average diameter between 30 and 150 $\mu$m) thus obtained was thermally treated in $N_2$ current by heating gradually from 50° C. to 100° C. until a molar ratio of $EtOH/MGCl_2 = 1.27$ was obtained. A support having the following characteristics was obtained: porosity 0.139 cc/g—surface area 9.1 $m^2/g$—bulk density 0.564 g/cc.

25 g of this support were introduced into a reaction vessel equipped with a stirrer and containing 625 cc of $TiCl_4$ at 0° C. Then under agitation, it was heated to 100° C. in one hour and maintained at that temperature for 2 hours. When the temperature reached 40° C., isobutyl phthalate was introduced in an amount such that the molar ratio $MgCl_2/DIBF = 8$. The hot liquid was removed by siphon and a second treatment of the solid with $TiCl_4$ was carried out, in the same amount, at 120° C. for 2 hours under agitation. Again the hot liquid phase was removed by siphon and nine anhydrous hexane washings (200 cc per wash), six at 60° C. and three at room temperature, were carried out. The solid catalyst component after vacuum drying (about 50° C. and 100 mmHg) had the following characteristics: $Ti = 2.8\%$ weight; $DIBF = 2.4\%$ weight; porosity = 0.38 cc/g; surface area 230 $m^2/g$; bulk density: 0.555 g/cc; morphology: 100% spherical particles.

2) Preparation of polymer composition-bitumen mixtures and characterization of samples of the same In a metal container were introduced 48 g of the polymer composition prepared as described above and 72 g of bitumen. They were slowly heated on a flame, while stirring with a spatula, so that the temperature did not exceed 180° C.

After the polymer was completely mixed with bitumen, 80 more g of bitumen were added and mixed until complete homogeneity of the system was obtained. The procedure took about one hour.

From the resultant mixture, a sample 14 cm wide and 25 cm long was obtained in the following fashion.

On a steel sheet were put, successively, a sheet of wax paper, a sheet of glass wool, and a metallic template 4 mm thick. In the cavity of the template were poured 100 g of the melted polymer composition-bitumen mixture. A sheet of wax paper and a metal plate were then put over the mixture and topped with a 10 Kg load. The system was left to cool to room temperature for one hour, the sample was extracted, the wax paper removed, and it was cut into 2.5×7×0.4 cm strips, on which were carried out the various tests.

A bitumen with a penetration index at 25° C., equal to 180/2900 dmm, was used for all the tests.

TABLE 1

Examples and Comparative Examples (C)

| | | EXAMPLE # | | | |
|---|---|---|---|---|---|
| | | 1 | 2 | 3 | 1C |
| PHASE A | | | | | |
| Pressure | Atm | 36.8 | 36.8 | 36.8 | 36.8 |
| Time | min. | 10 | 10 | 15 | 15 |
| Hydrogen in gaseous phase | % mol. | 17 | 17 | 17 | 17 |
| Isotactic index | % wt. | 95.4 | 95.5 | 95.5 | 95.4 |
| Intrinsic viscosity | dl/g | 0.72 | 0.82 | 0.74 | 1.18 |
| PHASE B | | | | | |
| Temperature | °C. | 50 | 50 | 50 | 60 |
| Pressure | Atm | 12.1 | 13.1 | 13.6 | 13.0 |
| Time | min. | 440 | 260 | 250 | 480 |
| Hydrogen in gaseous phase | % mol. | 3.8 | 7.1 | 3.6 | 7 |
| Ethylene in gaseous phase | % mol. | 8.9 | 11.8 | 19.0 | 24.7 |
| Ethylene/propylene in feed mixture | by weight | 20/80 | 25/75 | 35/65 | 50/50 |
| Instrinsic viscosity | dl/g | 1.21 | 1.0 | 1.5 | 1.21 |
| % weight | | 89 | 81.9 | 82.1 | 77.5 |
| FINAL PRODUCT | | | | | |
| Yield | KgPol/gTi | 396 | 306 | 369 | 400 |
| Ethylene | % wt. | 16.7 | 21.0 | 28.7 | 31.8 |
| Intrinsic viscosity | dl/g | 1.16 | 0.97 | 1.39 | 1.25 |
| Soluble in xylene | % wt. | 55.5 | 57.8 | 62.5 | 56.6 |
| Ethylene in the soluble in xylene | % wt. | 23.9 | 26.0 | 33.1 | 39.8 |
| Flowability at 23° C. | sec. | 23 | 27 | 24 | 25 |
| Tamped bulk density | Kg/l | 0.45 | 0.47 | 0.47 | 0.46 |
| Average particulate diameter | (mm) | 1.4 | 1.4 | 1.4 | 1.4 |

TABLE 2

Characterization of copolymer/bitumen mixtures

| Copolymer used (examples) | | 1 | 2 | 3 | 1C |
|---|---|---|---|---|---|
| Embrittlement Temperature | °C. | −5 | −10 | −11 | −11 |
| Penetration at 25° C. | dmm | 13 | 16 | 22.5 | 36 |
| Penetration at 60° C. (in air) | dmm | 36 | 45 | 65 | 91 |
| Softening point | °C. | 156 | 157 | 154 | 133 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention and described and claimed.

We claim:

1. A polymer composition consisting essentially of:

A) 10–50 parts by weight of propylene homopolymer having an isotactic index greater than 90 and an intrinsic viscosity from 0.5 to 1.5 dl/g; and
   B) 50–90 parts by weight of propylene-ethylene copolymer having 15–45 wt % ethylene, and having an intrinsic viscosity from 0.5 to 1.5 dl/g.

2. The composition of claim 1, wherein the amount of material soluble in xylene at room temperature of component A) and B) is from 40 to 90% by weight.

3. The composition of claim 1, wherein the component A is present in an amount of 15 to 35 parts by weight and component B) is present in an amount of 65 to 85 parts by weight.

4. The composition of claim 1, in the form of spheroidal particles having an average diameter of from 0.5 to 7 mm, and a bulk density (tamped) greater than 0.4 g/cc.

5. The composition of claim 2, in the form of spheroidal particles having an average diameter of from 0.5 to 7 mm, and a bulk density (tamped) greater than 0.4 g/cc.

6. Bitumens composition containing from 15 to 40 wt % of the composition of claim 4.

7. Bitumens composition containing from 15 to 40 wt. % of the composition of claim 5.

* * * * *

UNITED STATES PATENT AND TRADEMARK OFFICE
CERTIFICATE OF CORRECTION

PATENT NO. : 5,077,327
DATED : December 31, 1991
INVENTOR(S) : Cecchin et al

It is certified that error appears in the above-identified patent and that said Letters Patent is hereby corrected as shown below:

Col. 3, at lines 6 and 7 and lines 40 and 41, change "2√" to --26--.

Col. 3, line 22, change "-2" to --1-2--.

Col. 3, line 41, change "14.45" to --14.95--.

Col. 3, line 63, change "polymerizations" to --polymerization--.

Col. 6, line 19, change "MGCl$_2$" to --MgCl$_2$--.

Col. 6, last line, change "2900" to --200--.

Signed and Sealed this

First Day of March, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,077,327

DATED : December 31, 1991

INVENTOR(S) : Cecchin et al.

It is certified that error appears in the above-identified patent and that said Letters Patent is hereby corrected as shown below:

Column 3, at lines 6 and 7 and lines 40 and 41, change "2v" to --2ν--.

Signed and Sealed this

Twenty-ninth Day of March, 1994

Attest:

BRUCE LEHMAN

Attesting Officer     Commissioner of Patents and Trademarks